Sept. 8, 1959 R. W. PETERS ET AL 2,903,307
TWO COMPONENT BEARING
Filed April 18, 1956 4 Sheets-Sheet 2

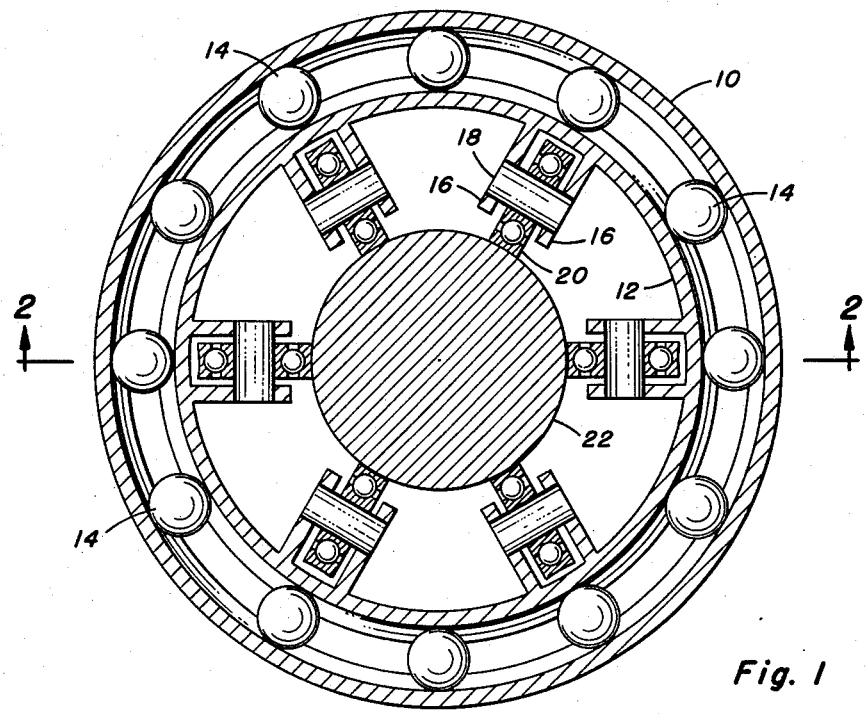
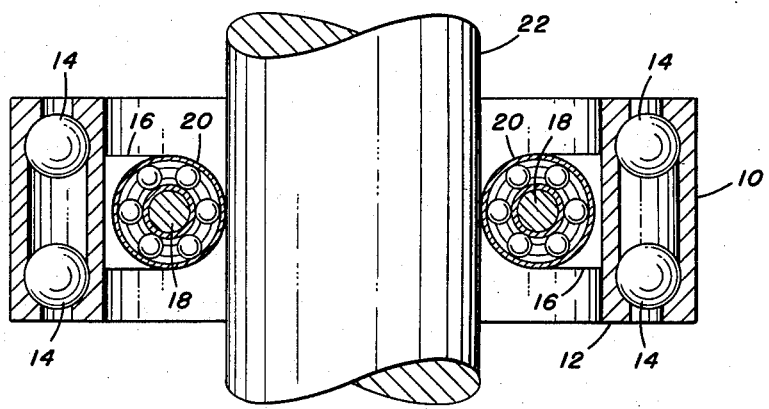
Fig. 1
Fig. 2

INVENTORS
ROGER W. PETERS
NORRIS F. DOW
BY
ATTORNEYS

Sept. 8, 1959 R. W. PETERS ET AL 2,903,307
TWO COMPONENT BEARING
Filed April 18, 1956 4 Sheets-Sheet 3
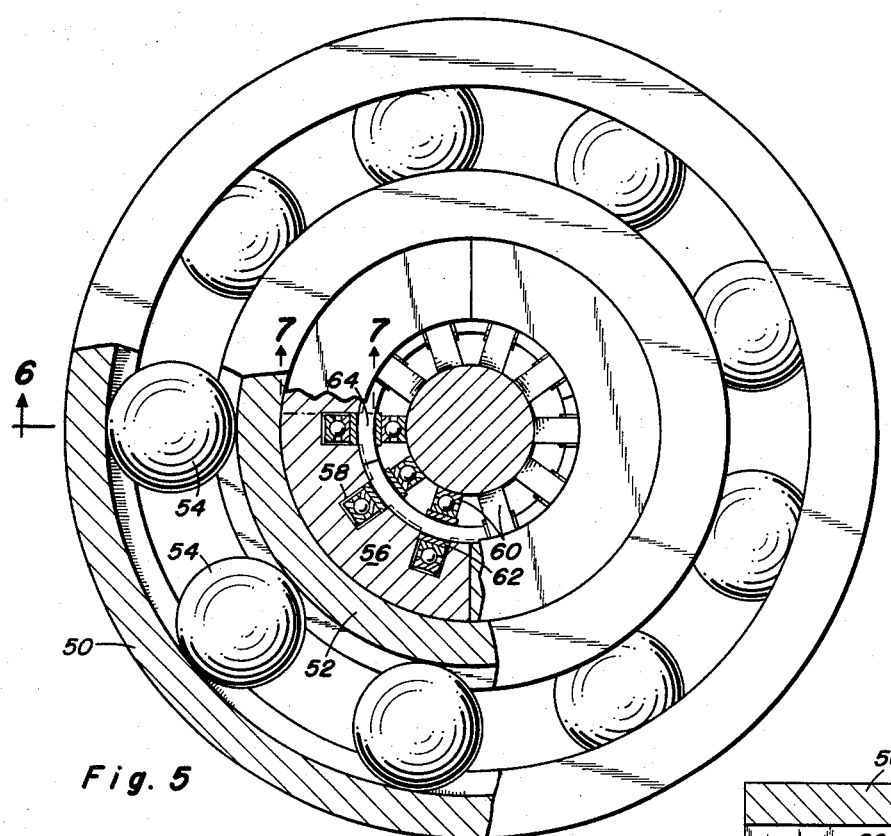
Fig. 5
Fig. 7
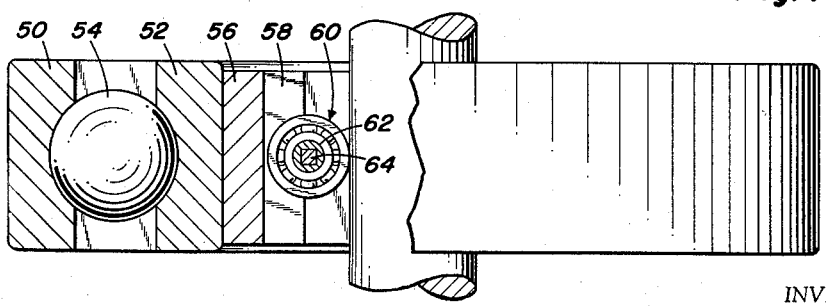
Fig. 6
INVENTORS
ROGER W. PETERS
NORRIS F. DOW
BY
ATTORNEYS Sept. 8, 1959 R. W. PETERS ET AL 2,903,307
TWO COMPONENT BEARING
Filed April 18, 1956 4 Sheets-Sheet 4

INVENTORS
ROGER W. PETERS
NORRIS F. DOW
BY
ATTORNEYS

United States Patent Office 2,903,307
Patented Sept. 8, 1959

2,903,307

TWO COMPONENT BEARING

Roger W. Peters, Warwick, Va., and Norris F. Dow, Schenectady, N.Y., assignors to the United States of America as represented by the Secretary of the Navy Application April 18, 1956, Serial No. 579,121

1 Claim. (Cl. 308—177)

(Granted under Title 35, U.S. Code (1952), sec. 266)

The invention described herein may be manufactured and used by or for the Government of the United States of America for governmental purposes without the payment of any royalties thereon or therefor.

The present invention relates to a two component bearing and more particularly to a bearing which will permit a shaft held therein to both translate and rotate with a minimum of friction. The bearing of the present invention possesses characteristics which enable it to be used where only extremely fine tolerances are permitted, such as in stress-strain testing machines.

An object of the present invention is the provision of a bearing which will permit a shaft to translate freely therein and also permit rotation of the shaft.

Another object is to provide a bearing which may be made from a number of standard components.

A further object of the invention is the provision of a bearing comprising a guide bearing for a shaft and a rotary bearing carrying the guide bearing.

A final object is to provide a two component bearing in which the inner race of one bearing has a spider integral therewith for carrying a plurality of bearings.

Other objects and many of the attendant advantages of this invention will be readily appreciated as the same becomes better understood by reference to the following detailed description when considered in connection with the accompanying drawings wherein:

Fig. 1 is a cross-sectional view of one form of the bearing of the present invention, Fig. 2 is a cross-sectional view taken on the line 2—2 of Fig. 1, Fig. 3 is a partial cross-sectional view of a second form of the invention, Fig. 4 is an exploded cross-sectional view taken on the line 4—4 of Fig. 3, Fig. 5 is a partial cross-sectional view of yet another form of the invention, Fig. 6 is a partial cross-sectional view taken on the line 6—6 of Fig. 5.

Fig. 7 is a cross-sectional view taken on line 7—7 of Fig. 5,

Figure 3:
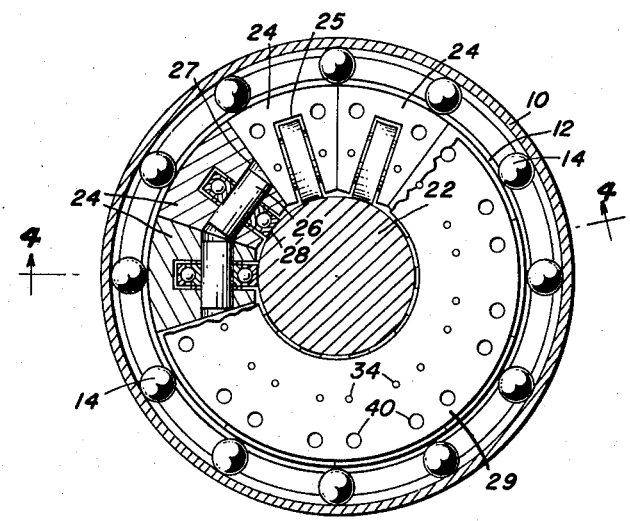

Referring now to the drawings, wherein like reference characters designate like or corresponding parts throughout the several views, there is shown in Fig. 1 an outer race 10 and an inner race 12 having between them a plurality of balls 14. The inner race 12 has extending inwardly therefrom a plurality of integral ears 16 spaced in paired relation as shown. Between each pair of ears 16 extends a shaft 18 which carries thereon a ball bearing 20. Preferably, there are six such ball bearings 20, although the number may be varied for different installations. A shaft 22 is carried by the ball bearings 20 and may reciprocate axially with a minimum of friction.

Figure 4:
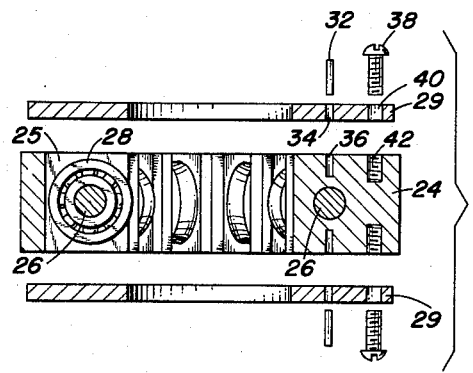

In Fig. 3 there is shown another construction of the bearing which permits the translation of the shaft. In this embodiment, a spider consisting of a plurality of arcuate segments 24 is fixedly positioned within inner race 12. Each segment 24 has a radially inwardly extending slot 25 formed therein wherein a shaft 26 is positioned and carried by bores 27 formed in the segment on both side walls of the slot. A relatively small sized bearing 28 is mounted on the shaft 26 of each of the segments for supporting the reciprocating shaft 22 extending through the center aperture defined by the spider assembly. A sufficient number of segments of the proper size are used so that complete support of the shaft 22 is provided, as is apparent from Fig. 3. In Fig. 4 there is shown a manner in which the segments 24 are held in a spider assembly. On each side of the segments 24 there is placed a washer 29. Washers 29 are positioned on the segments 24 by means of pins 32 passing through holes 34 in the washer and into a corresponding hole 36 in the segment 24. A screw 38 is shown which will pass through a hole 40 in washer 29 and be secured in a tapped hole 42 in segment 24.

In Fig. 5 there is shown yet another form of the invention, there being shown therein a bearing having an outer race 50, an inner race 52 and a plurality of balls 54 therebetween. Within the inner race 52 there is carried a spider 56 made from two identical semi-circular parts. The spider 56 has a plurality of slots 58 therein for receiving a ball bearing 60. The inner race of the ball bearing 60 is mounted upon a bearing insert 62 which has a square hole in the center. Through this square hole there passes a split ring 64 of square shaped cross-section. Split ring 64 is conveniently made in two halves, each of semi-circular shape. To prevent the movement of the ball bearings 60 and the split ring 64 in relation to the spider 56, split ring 64 is positioned in a groove 66 in the interior face of the spider 56, as is clearly shown in Fig. 7.

Figure 8:
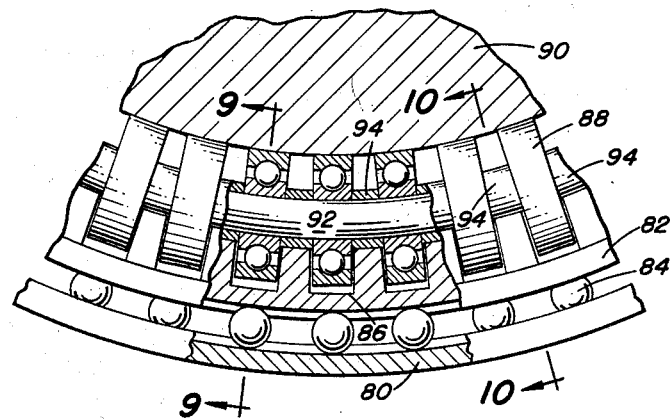
Fig. 8 is a view, partly in cross-section, of a final embodiment of the invention.
Figure 9:
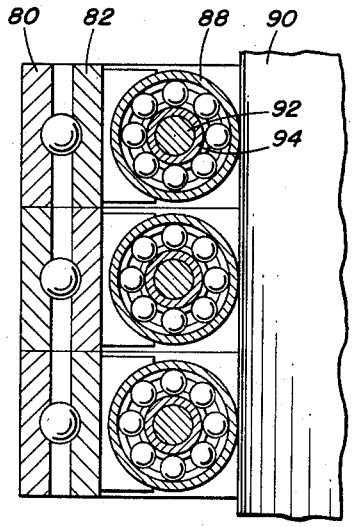
Fig. 9 is a cross-sectional view taken on the line 9—9 of Fig. 8.
Figure 10:
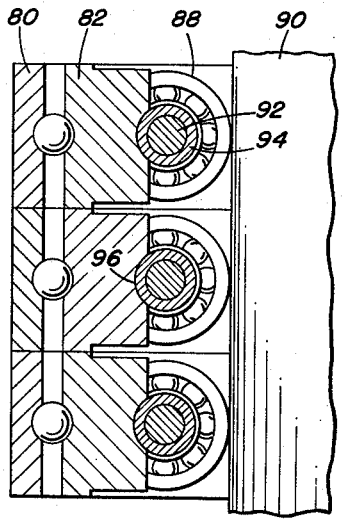
Fig. 10 is a cross-sectional view taken on the line 10—10 of Fig. 8.

In the form of the invention shown in Fig. 8, there is shown a ball bearing having an outer race 80 and an inner race 82 having between them a plurality of balls 84. Inner race 82 is of substantial radial extent, and has therein a plurality of slots 86 in each of which there is a ball bearing 88, which support a shaft 90 for axial movement. The ball bearings 88 are carried on a ring member 92 (see Figs. 9 and 10): the ring member 92 extends through spacers 94 which are interspersed between the bearings 88 and which rest in small, conforming cut-outs 96 in the inner race, as shown in Fig. 10. Preferably, several individual bearings are placed in axial relation relative to the shaft 90, three being shown by way of example in Figs. 9 and 10. This embodiment of the invention is similar to Fig. 1 in that the inner race integrally carries the ball bearings permitting axial movement. Also, this embodiment is similar to that of Fig. 5 in that a large annular segment is slotted at intervals to receive ball bearings. Of course, any number of segments may be used, two or three being preferred.

By means of any of the above-described constructions, a shaft carried by the inner ball bearings may move axially of itself with a minimum of frictional resistance. Also, rotation of the shaft may be affected with minimum resistance due to the ability of the outer ring of ball bearings to rotate freely, the outer race being fixed to a support in known manner.

Obviously many modifications and variations of the present invention are possible in the light of the above teachings. It is therefore to be understood that, within the scope of the appended claim, the invention may be practiced otherwise than as specifically described.

We claim:

A bearing for permitting both rotary and axial movement of a shaft comprising an outer radial ball bearing, a spider assembly fixedly positioned within the inner race of said outer ball bearing and defining a central aperture wherein the shaft is disposed, said spider assembly being formed of a plurality of arcuate shaped segments, a radially inwardly extending slot formed in each of said segments, a pin journalled in said slot of each of said segments, an inner radial ball bearing mounted on said pin of each of said segments, the axis of each inner ball bearing lying in a plane perpendicular to the longitudinal axis of said outer ball bearing, and the outer race of each inner ball bearing extending into said central aperture for supporting the shaft disposed therethrough, and a centrally apertured cover plate secured to each of two opposite faces of each of said segments for maintaining said segments in said spider assembly.

References Cited in the file of this patent

UNITED STATES PATENTS

| | | |
|---|---|---|
| 867,511 | Karns | Oct. 1, 1907 |
| 1,123,851 | Cooper | Jan. 5, 1915 |
| 1,880,361 | Schroeder | Oct. 4, 1932 |
| 2,337,854 | Price | Dec. 28, 1943 |
| 2,493,856 | Buhler | Jan. 10, 1950 |

FOREIGN PATENTS

| | | |
|---|---|---|
| 283,855 | Switzerland | Oct. 16, 1952 |